INVENTOR
Selden B. Aylsworth.
BY
HIS ATTORNEY

Patented Nov. 21, 1944

2,363,038

UNITED STATES PATENT OFFICE 2,363,038

ELECTRICAL RELAY

Selden B. Aylsworth, Edgewood, Pa., assignor to The Union Switch & Signal Company, Swissvale, Pa., a corporation of Pennsylvania Application October 23, 1942, Serial No. 463,041

12 Claims. (Cl. 175—320)

My invention relates to electrical relays, and particularly to direct current polarized relays provided with a neutral armature which will remain picked up during quick reversals in the polarity of the energizing current.

Relays of this type as they have heretofore generally been constructed are usually similar to the relay disclosed in Letters Patent of the United States No. 1,852,210, granted to Frederick C. Larson on April 5, 1932, and comprise, in addition to the usual energizing winding, a secondary winding inductively coupled to the main energizing winding and electrically connected to a retaining winding controlling a retaining armature attached to and movable with the main armature, whereby when the polarity of the energizing current is reversed quickly, the resultant electromotive force which is induced in said secondary winding will energize said retaining winding, and thus exert on the retaining armature sufficient tractive force to retain the main neutral armature in its attracted position during the brief interval of time required for the polar armature to reverse.

One object of my invention is to improve relays of the type described by eliminating the necessity for the secondary winding.

Another object of my invention is to decrease the size of relays of the type described, increase their efficiency, and at the same time effect a saving in materials.

According to my invention, I inductively energize the retaining winding during reversals in the polarity of the energizing current supplied to the main winding by connecting it with all or a part of the main winding through a rectifier and a normal or a reverse polar contact of the relay. The parts are so arranged that when the polarity of the energizing current is reversed, the rectifier will permit the current induced by the decaying flux in that part of the main winding with which the retaining winding is connected to flow in the retaining winding until the polar armature reverses, and will thereafter prevent further flow of current. This arrangement also permits some energizing current from the external circuit to flow in the retaining winding during the brief period before the polar armature reverses.

Other objects and characteristic features of my invention will become apparent as the description proceeds.

I shall describe several forms of relays embodying my invention, and shall then point out the novel features thereof in claims.

Figures 1, 2:
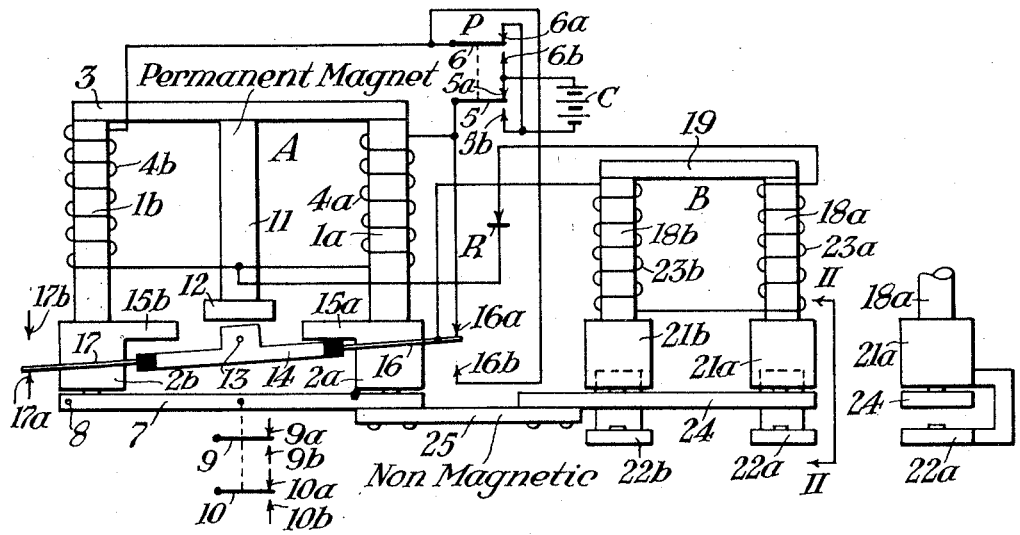
Figure 3:
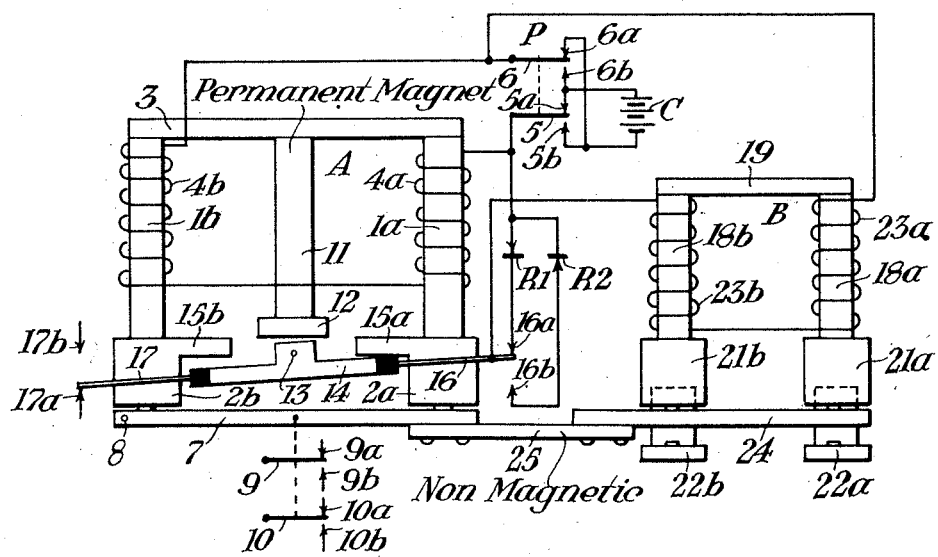
Figure 4:
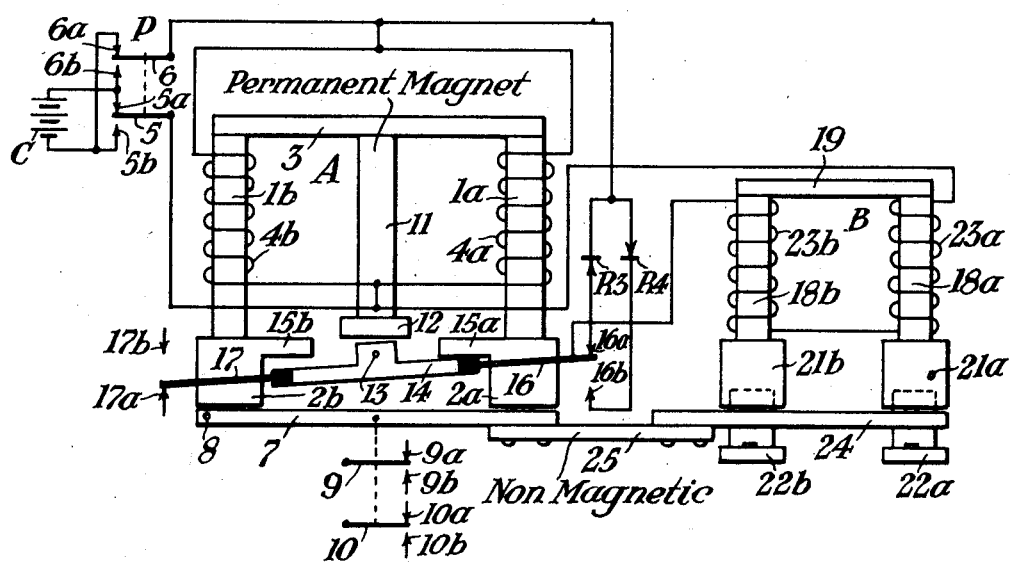

In the accompanying drawings, Fig. 1 is a diagrammatic view illustrating one form of neutral polar relay constructed in accordance with my present invention. Fig. 2 is a fragmentary sectional view taken on the lines II—II of Fig. 1. Figs. 3 and 4 are diagrammatic views similar to Fig. 1 illustrating modifications of the structure shown in Fig. 1.

Similar reference characters refer to similar parts in all four views.

Referring first to Fig. 1, the relay here shown comprises a main electromagnet A of the usual type having two parallel cores $1a$ and $1b$ connected together at their upper ends by a magnetizable backstrap 3, and provided at their lower ends with enlarged pole pieces $2a$ and $2b$, respectively. The core $1a$ carries the usual energizing coil $4a$, and the core $1b$ carries a similar coil $4b$. These coils together comprise the operating winding of the relay, and are connected in series to supply cumulative fluxes to the cores $1a$ and $1b$ in the customary manner. Current for energizing the coils $4a$ and $4b$ is supplied from a battery C over the contacts 5—$5a$ and 6—$6a$ or 5—$5b$ and 6—$6b$, respectively, of a pole changer P. The parts are so arranged that when the contacts 5—$5a$ and 6—$6a$ are closed, the current supplied to the windings will have what I shall term "normal" relative polarity, whereas, when the contacts 5—$5b$ and 6—$6b$ are closed, the current will then have what I shall term "reverse" relative polarity.

A main tractive armature 7 is pivotally mounted at 8 for swinging movement toward or away from the pole pieces $2a$ and $2b$ according as the operating winding $4a$—$4b$ is energized with current of either polarity or is deenergized. Operatively connected with the armature 7 are a plurality of contact fingers 9 and 10 shown diagrammatically in the drawing. These fingers cooperate with fixed front contact members $9a$ and $10a$ to close front contacts 9—$9a$ and 10—$10a$ when the armature is swung toward the pole pieces $2a$ and $2b$, and with fixed back contact fingers $9b$ and $10b$ to close back contacts 9—$9b$ and 10—$10b$ when the armature 7 is swung away from the pole pieces $2a$ and $2b$.

Associated with the electromagnet A is a constantly magnetized core 11, here shown as a permanent magnet, the upper end of which engages the underside of the backstrap 3, and the lower end of which is provided with an enlarged pole piece 12. Pivotally supported at 13 adjacent to the pole piece 12 is a polarized armature 14. The pole pieces $2a$ and $2b$ of the main electromagnet A are provided with integral extensions $15a$ and $15b$, respectively, the pole faces of which overlie the opposite ends of the armature 14, and it will be apparent therefore that the polarized armature will swing toward one or the other of these extensions, depending upon the polarity of the current which is supplied to the energizing winding 4a—4b. When the polarized armature is swung toward the extension 15a, as shown, two contact fingers 16 and 17 secured to, but insulated from, the armature engage fixed normal contact members 16a and 17a respectively to close normal contacts 16—16a and 17—17a. When the polarized armature is swung toward the extension 15b, however, the contact fingers 16 and 17 move out of engagement with the associated normal contact members and into engagement with fixed reverse contact members 16b and 17b, respectively, thus opening the contacts 16—16a and 17—17a and closing reverse contacts 16—16b and 17—17b.

It should be noted that while, for purposes of illustration, I have shown the main and polarized armatures each provided with only two contact fingers, these armatures may each be provided with as many other contact fingers as desired.

The relay also comprises an auxiliary or holding electromagnet B including a pair of parallel cores 18a and 18b connected together at their upper ends by a magnetizable backstrap 19, and provided at their lower ends with enlarged pole pieces 21a and 21b having integral U-shaped extensions 22a and 22b, respectively, (see the extension 22a shown in Fig. 2). Surrounding the cores 18a and 18b are holding windings 23a and 23b, which windings, as here shown, are connected in series in a manner to set up cumulative fluxes in the electromagnet cores. The pole pieces 21a and 21b and the polar extensions 22a and 22b cooperate with an auxiliary armature 24 which is attached to the main armature 7 by means of a non-magnetizable connecting member 25. The parts are so proportioned that the auxiliary armature 24 will be swung toward the pole pieces 21a and 21b or toward the extensions 22a and 22b according as the main armature is swung toward the pole pieces 2a and 2b to its attracted position or away from the pole pieces 2a and 2b to its released position, and that when the armature 24 occupies either its attracted or its released position if the holding windings 23a and 23b are then energized, the armature 7 will be retained in the corresponding position regardless of whether the electromagnet A is then energized or deenergized.

With the relay constructed in the manner described, it will be obvious that when the supply of current to the winding 4a—4b of the main electromagnet A is pole changed to reverse the polar armature 14, if the windings of the auxiliary electromagnet remain deenergized, the main armature 7 will momentarily release because the current, and therefore the magnetic flux, passes through zero. This is undesirable for many circuit applications, and my present invention relates to novel means which I shall now describe for momentarily energizing the electromagnet B when the supply of current to the windings 4a and 4b is pole changed, or is momentarily interrupted, to cause the armature 24 to exert on the armature 7 a torque which is effective under these conditions to retain the armature 7 in its picked-up or attracted position. According to the preferred form of my invention shown in Fig. 1, I connect the windings 23a and 23b of the auxiliary magnet in multiple with the coil 4a or the coil 4b of the main magnet over two branch circuits the one of which includes the normal polar contact 16—16a and an asymmetric unit R which functions as a half wave rectifier, and the other of which includes the reverse polar contact 16—16b and the asymmetric unit R.

With the windings 23a and 23b connected in this manner the operation of the relay as a whole is as follows: As shown in the drawings, the contacts 5a and 6a of pole changer P are closed, so that current of normal polarity is supplied to the coils 4a and 4b of the energizing winding. Under these conditions, the neutral armature 7 is held by flux from the main magnet in its attracted position in which the contacts 9—9a and 10—10a are closed and the contacts 9—9b and 10—10b are open, and the polar armature 14 is swung toward the extension 15a so that the normal polar contacts 16—16a and 17—17a are closed and the reverse polar contacts 16—16b and 17—17b are open. Since the normal polar contact 16—16a is closed, the branch circuit for the windings 23a and 23b of the holding magnet including this contact is closed, but the asymmetric unit R is poled in such direction that it prevents current from the battery C from flowing in this circuit, and the windings 23a and 23b are therefore deenergized.

I shall now assume that with the parts in the positions shown, the pole changer P is reversed relatively quickly to cause the polarized armature of the relay to reverse. During the reversal of the pole changer, the flux in the cores 1a and 1b will rapidly drop to zero, and will then build up in the opposite direction. This change in flux in the cores 1a and 1b will induce an electromotive force in the windings 4a and 4b, and during the interval which elapses before the polar contact 16—16a opens, the electromotive force induced in coil 4a will cause current to flow through the closed circuit formed by the winding 4a, and the branch circuit including the contact 16—16a, the windings 23a and 23b and the asymmetric unit R. Furthermore, since the polarity of current supplied to the main energizing circuit is now reversed, as long as the contact 16—16a remains closed, some current will also be supplied to the windings 23a and 23b from battery C, the current path under these conditions being from the lower terminal of battery C through contact 5—5b of pole changer P, normal polar contact 16—16a, the windings 23a and 23b in series, asymmetric unit R in its low resistance direction, winding 4b and contacts 6—6b of pole changer P to the other terminal of battery C. The resultant current flowing in windings 23a and 23b will energize the holding magnet B and will thus cause the armature 24 to exert on the main armature 7 a holding torque which acts to prevent the armature 7 from moving away from its picked-up position. As soon as the polar armature 14 reverses, the branch circuit which was previously closed for the windings 23a and 23b at normal contact 16—16a will become opened and the other branch circuit for these windings including reverse contact 16—16b will become closed. When this happens, the asymmetric unit R will act to prevent any further flow of current.

If the pole changer P is pole changed to reverse the polar armature 14 when the polar armature occupies its reverse position, the retaining magnet will again become energized in a manner similar to that just described and will thus act to prevent the neutral armature from releasing.

However, under these conditions the windings 23a and 23b will be energized in part by the current induced in coil 4b flowing in the closed circuit formed by this coil and the branch circuit for the windings 23a and 23b including the asymmetric unit R and the reverse polar contact 16—16b and in part by the current passing from battery C through contact 6—6a of pole changer P, contact 16—16b, windings 23a and 23b in series, asymmetric unit R in its low resistance direction, winding 4a, and contact 5—5a of pole changer P to battery C. It will be obvious, of course, that as soon as the polar contact 16—16b opens the supply of current to windings 23a and 23b will be cut off.

If the magnet A is momentarily deenergized and is then reenergized in the same direction, the auxiliary armature 24 will likewise act to retain the neutral armature closed. However, under these conditions no current will be supplied to the windings 23a and 23b of the holding magnet from the battery C because the asymmetric unit R will act to block the flow of current to the windings 23a and 23b from the battery.

If the pole changer P is opened for a sufficient interval of time to permit the main armature to release, and is then closed in the direction to supply the main electromagnet with current having a polarity opposite to that with which it was previously energized, the main armature will be prevented from picking up until after the polar armature has moved to a position in agreement with the polarity of the energizing current. The reason for this is that when the polarity of the current is reversed under the conditions just described, as long as the polar armature remains in its last energized position, the windings 23a and 23b will be supplied with energizing current from the battery C over the branch circuit which is then closed for these windings, and since the auxiliary armature 24 now occupies its lowermost position, the flux set up in the electromagnet will act through the polar extensions 22a and 22b to exert a hold-down torque on the armature 24. This hold-down torque will of course be transmitted to the main armature through the connecting member 25 and will act to prevent the main armature from picking up. As soon, however, as the polar armature assumes a position in agreement with the polarity of the current, the supply of current to the windings 23a and 23b will be interrupted, and the main armature 7 will pick up in the usual manner.

It should be particularly pointed out that with the relay constructed as shown in Fig. 1, the holding magnet is always energized in the same direction. This makes it unnecessary to buck down the residual in the holding magnet under any conditions and insures uniformity of the operating characteristics of the relay.

Referring now to Fig. 3, the form of relay here shown differs from that shown in Fig. 1 in that the windings 23a and 23b of the auxiliary magnet, instead of being connected in multiple with only one of the coils of the main magnet B at any one time, are always connected in multiple with both coils in series in such manner that when the polarity of the current supplied to the electromagnet is reversed or momentarily interrupted, the current induced in both coils by the decaying flux will be supplied to the windings 23a and 23b. The windings are connected in multiple with the coils by virtue of two branch circuits one of which passes from the upper terminal of coil 4a through an asymmetric unit R1 poled to pass current of reverse polarity only, normal polar contact 16—16a, and the windings 23a and 23b of holding magnet B in series to the upper terminal of coil 4b, and the other of which passes from the upper terminal of coil 4b through the windings 23a and 23b in series, reverse polar contact 16—16b, and an asymmetric unit R2 poled to pass current of normal polarity only, to the upper terminal of coil 4a.

With the coils connected in this manner when the pole changer P is reversed to cause the polarized armature to move from the normal position shown to its reverse position, the current induced in both coils 4a and 4b by the decaying flux will flow in the closed circuit formed by the coils 4a and 4b in series, the asymmetric unit R1, normal polar contact 16—16a, and the windings 23a and 23b. Some current will also be supplied to the windings 23a and 23b from battery C through contact 5—5b of pole changer P, asymmetric unit R1, normal polar contact 16—16a, the windings 23a and 23b in series and contact 6—6b of pole changer P back to battery C. As soon as the polar armature 14 reverses, the resultant opening of the normal polar contact 16—16a will interrupt both circuits over which the windings 23a and 23b were previously supplied with current, while the closing of reverse polar contact 16—16b will close the branch circuit for the windings 23a and 23b including this contact. No current will flow in this latter circuit under these conditions, however, due to the asymmetric unit R2.

When the relay is energized by current of reverse polarity after the pole changer P is reversed, the operation will be similar to that just described, and it is believed that this operation will be apparent from an inspection of the drawings without further detailed description.

If the relay is momentarily deenergized and is then reenergized in the same direction, the windings 23a and 23b will be supplied with the current induced in the coils 4a and 4b by the decaying flux, but the asymmetric unit R1 or R2 depending upon whether the polar armature then occupies its normal or its reverse position will prevent current from being supplied to the windings 23a and 23b directly from the battery C. The induced current supplied to the windings, however, will be sufficient to retain the main armature 7 closed.

If the relay is deenergized for a sufficient time to permit the main armature to release and is then energized with current having a polarity opposite to that with which it was previously energized, the windings 23a and 23b will become energized and will prevent the main armature from picking up until after the polar armature has moved to a position in agreement with the polarity of the energizing current. This operation is similar to that described in connection with Fig. 1 and it is therefore believed to be unnecessary to describe it in detail.

Referring now to Fig. 4, as here shown, the coils 4a and 4b are connected in parallel instead of in series, and the windings 23a and 23b are arranged to be connected in parallel with both coils by virtue of two branch circuits the one of which passes from the common lower connection of the coils 4a and 4b through the windings 23a and 23b of holding magnet B in series, normal polar contact 16—16a and an asymmetric unit R3 poled to pass current of reverse polarity only, to the common upper connection of the coils 4a and 4b, and the other of which passes from the common upper connection of coils 4a and 4b through an asymmetric unit R4 poled to pass current of normal polarity only, reverse polar contact 16—16b, and the windings 23a and 23b in series to the common lower connection of the coils 4a and 4b.

The operation of the relay shown in Fig. 4 is similar to the operation of the relays shown in Figs. 1 and 3, and it is thought that this operation will be obvious from the drawings without further detailed description.

One advantage of relays constructed in accordance with my invention is that the main armature will remain picked up when the supply of current to the relay is reversed if the operating current is lowered a considerable amount below the normal working current.

Another advantage of relays constructed in accordance with my invention is that the operation is positive and efficient. The main armature is retained in its picked-up position even if the polarity of the energizing current is reversed again at the instant the polar armature completes its stroke.

A further advantage of relays embodying my invention is that all of the winding space on the main electromagnet can be used to energize the relay, thus providing the lowest possible current operating values for a given relay.

Although I have herein shown and described only three forms of relays embodying my invention, it is understood that various changes and modifications may be made therein within the scope of the appended claims without departing from the spirit and scope of my invention.

Having thus described my invention, what I claim is:

1. An electrical relay comprising an energizing winding, a main armature responsive to the presence or absence of current in said energizing winding, a polar armature responsive to the polarity of the current supplied to said energizing winding, a retaining winding, an auxiliary armature secured to and movable with said main armature and responsive to the presence or absence of current in said retaining winding, and means including a rectifier and contacts controlled by said polar armature for connecting said retaining winding with said energizing winding, said rectifier being poled to prevent energization of said retaining winding except when the supply of current to said energizing winding is varied.

2. An electrical relay comprising an energizing winding, a main armature responsive to the presence or absence of current in said energizing winding, a polar armature responsive to the polarity of the current supplied to said energizing winding, a retaining winding, means controlled by said retaining winding and effective if said main armature occupies an attracted position when said retaining winding is energized for retaining said main armature in its attracted position, and means controlled by said polar armature for energizing said retaining winding until said polar armature reverses when the supply of current to said energizing winding is reversed.

3. An electrical relay comprising an energizing winding, a main armature responsive to the presence or absence of current in said energizing winding, a polar armature responsive to the polarity of the current supplied to said energizing winding, means controlled by said retaining winding and effective if said retaining winding is energized when the supply of current to said energizing winding is reversed for preventing said main armature from releasing, and means controlled by said polar armature and including rectifier means for energizing said retaining winding until said polar armature reverses when the supply of current to said energizing winding is reversed.

4. An electrical relay comprising a main armature and a retaining armature connected together to operate as a unit, an energizing winding associated with said main armature, a retaining winding associated with said retaining armature, a polar armature responsive to the polarity of the current supplied to said energizing winding, means including an asymmetric unit and a normal polar contact controlled by said polar armature for connecting said retaining winding in multiple with said energizing winding when said polar armature occupies its normal position, and other means including said asymmetric unit and a reverse polar contact controlled by said polar armature for connecting said retaining winding in multiple with said energizing winding when said polar armature occupies its reverse position, said asymmetric unit being effective to prevent current from being supplied to said retaining winding except during the interval required for the polar armature to reverse when the supply of current to said energizing winding is reversed.

5. An electrical relay comprising a main armature and a retaining armature connected together to operate as a unit, an energizing winding associated with said main armature, a retaining winding associated with said retaining armature, a polar armature responsive to the polarity of the current supplied to said energizing winding, means including a first polar contact controlled by said polar armature for energizing said retaining winding by the current induced in said energizing winding by the decaying flux when the polarity of the current supplied to said energizing winding is changed from normal to reverse polarity, and other means including a second polar contact controlled by said polar armature for energizing said retaining winding by the current induced in said energizing winding by the decaying flux when the polarity of the current supplied to said energizing winding is changed from reverse to normal polarity.

6. In combination, a direct current electromagnet having the usual operating winding, a main and a polar armature controlled by said electromagnet, an auxiliary armature controlled by an auxiliary winding and operatively connected with said main armature, said auxiliary armature being effective if said auxiliary winding is energized when said main armature occupies its attracted position to retain said auxiliary armature in its attracted position, and an energizing circuit for said auxiliary winding including a polar contact controlled by said polar armature and an asymmetric unit poled to prevent the flow of current of the polarity which causes said polar armature to close said polar contact.

7. In combination, a direct current electromagnet having the usual operating winding, a main and a polar armature controlled by said electromagnet, an auxiliary armature controlled by an auxiliary winding and operatively connected with said main armature, said auxiliary armature being effective when said auxiliary winding is energized to retain said main armature in either its attracted or its released position depending upon which position it then occupies, and means effective if the polarity of the current supplied to said electromagnet is reversed for energizing said auxiliary winding by current from the same source that said electromagnet is energized from until said polar armature reverses and for thereafter preventing the further flow of current to said auxiliary winding from said source.

8. In combination, a direct current electromagnet having the usual operating winding, a main and a polar armature controlled by said electromagnet, an auxiliary armature controlled by an auxiliary winding and operatively connected with said main armature, said auxiliary armature being effective when said auxiliary winding is energized to retain said main armature in either its attracted or its released position depending upon which position it then occupies, and means effective if the polarity of the current supplied to said electromagnet is reversed for energizing said auxiliary winding in part by current from the same source as said electromagnet and in part by the current induced in the operating winding of said electromagnet, said energization being terminated by the reversal of said polar armature.

9. In combination, an electromagnet having the usual operating winding, a main and a polar armature controlled by said electromagnet, a retaining electromagnet having a retaining winding, an auxiliary armature controlled by said retaining electromagnet and connected with said main armature for holding said main armature in the position which it occupies when said retaining magnet becomes energized, an energizing circuit for said operating winding including a source of current and a pole changer, and a branch circuit for said retaining winding connected across said operating winding and including an asymmetric unit and a polar contact controlled by said polar armature, said asymmetric unit being poled to pass current of the opposite polarity to that which causes said polar contact to close.

10. In combination, an electromagnet having the usual operating winding, a main and a polar armature controlled by said electromagnet, a retaining electromagnet having a retaining winding, an auxiliary armature controlled by said retaining electromagnet and connected with said main armature for holding said main armature in the position which it occupies when said retaining magnet becomes energized, an energizing circuit for said operating winding including a source of current and a pole changer, a first branch circuit for said retaining winding connected across said operating winding and including a first asymmetric unit and a first polar contact controlled by said polar armature, a second branch circuit for said retaining winding connected across said operating winding and including a second asymmetric unit and a second polar contact controlled by said polar armature and closed in the position of the polar armature opposite to that in which said first polar contact is closed, said asymmetric units being poled to permit the flow of current of the opposite polarity to that which causes the polar armature to move to the position in which the branch circuit including the unit is closed.

11. In combination, an electromagnet having the usual operating winding consisting of two coils connected in series to supply cumulative fluxes to the electromagnet, a main and a polar armature controlled by said electromagnet, a retaining electromagnet having a retaining winding, an auxiliary armature controlled by said retaining electromagnet and connected with said main armature for holding said main armature in the position which it occupies when said retaining magnet becomes energized, an energizing circuit for said operating winding including a source of current and a pole changer, a first branch circuit for said retaining winding connected across one coil of said operating winding over a contact controlled by said polar armature and closed only when said polar armature occupies its normal position, a second branch circuit for said retaining winding connected across the other coil of said operating winding over a contact controlled by said polar armature and closed only when said polar armature occupies its reverse position, and an asymmetric unit included in both said branch circuits and effective to prevent said retaining winding from becoming energized except when the supply of current to said operating winding is varied.

12. In combination, an electromagnet having the usual operating winding, a main and a polar armature controlled by said electromagnet, a retaining electromagnet having a retaining winding, an auxiliary armature controlled by said retaining electromagnet and connected with said main armature for holding said main armature in the position which it occupies when said retaining magnet becomes energized, an energizing circuit for said operating winding including a source of current and a pole changer, two branch circuits for said retaining winding connected in multiple with said operating winding and including respectively a normal and a reverse polar contact controlled by said polar armature, and means associated with said branch circuits for preventing the energization of said retaining winding except when the supply of current to said operating winding is varied.

SELDEN B. AYLSWORTH.